United States Patent
Barrows

[19]
[11] Patent Number: 6,137,401
[45] Date of Patent: Oct. 24, 2000

[54] ENGINE BRAKE INDICATOR LIGHT

[76] Inventor: Kevin L. Barrows, 60 7th Ave., Hudson Falls, N.Y. 12839

[21] Appl. No.: 09/247,993

[22] Filed: Feb. 11, 1999

[51] Int. Cl.[7] ..................................................... B60Q 1/44
[52] U.S. Cl. .......................... 340/479; 477/73; 477/200; 477/201; 192/30 W
[58] Field of Search .................................. 340/479, 463, 340/468, 475; 477/200, 201, 73; 192/30 W, 219

[56] References Cited

U.S. PATENT DOCUMENTS

| | | | |
|---|---|---|---|
| 4,295,540 | 10/1981 | Hildebrecht | 477/73 |
| 4,654,645 | 3/1987 | Yamagishi | 340/635 |
| 4,757,301 | 7/1988 | Neale, Jr. | 340/479 |
| 5,097,724 | 3/1992 | Braun | 477/73 |
| 5,376,918 | 12/1994 | Vinciguerra et al. | 340/479 |
| 5,426,418 | 6/1995 | Furgeson | 340/479 |

*Primary Examiner*—Julie B. Lieu

[57] ABSTRACT

An engine brake indicator system is provided for use with a vehicular accessory power source and a pair of brake lights mounted on a rear of a vehicle. Included is an engine brake having a plurality of engine brake coils, a stage switch, and an engine brake master switch with a first orientation upon the engine brake being unemployed and a second orientation upon the engine brake being employed. In use, the engine brake master switch is connected between the power source and the brake lights for actuating the brake lights only upon being in the second orientation.

5 Claims, 1 Drawing Sheet

ENGINE BRAKE INDICATOR LIGHT

BACKGROUND OF THE INVENTION

1. Field of the Invention

The present invention relates to engine brakes and more particularly pertains to a new engine brake indicator light for providing an indication to a following driver that a vehicle is slowing by way of an engine brake.

2. Description of the Prior Art

The use of engine brakes is known in the prior art. More specifically, engine brakes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,491,466; U.S. Pat. No. 4,806,782; U.S. Pat. No. 3,601,796; U.S. Pat. No. 3,710,315; U.S. Pat. No. 2,312,300; and U.S. Pat. No. Des. 389,929.

In these respects, the engine brake indicator light according to the present invention substantially departs from the conventional concepts and designs of the prior art, and in so doing provides an apparatus primarily developed for the purpose of providing an indication to a following driver that a vehicle is slowing by way of an engine brake.

SUMMARY OF THE INVENTION

In view of the foregoing disadvantages inherent in the known types of engine brakes now present in the prior art, the present invention provides a new engine brake indicator light construction wherein the same can be utilized for providing an indication to a following driver that a vehicle is slowing by way of an engine brake.

The general purpose of the present invention, which will be described subsequently in greater detail, is to provide a new engine brake indicator light apparatus and method which has many of the advantages of the engine brakes mentioned heretofore and many novel features that result in a new engine brake indicator light which is not anticipated, rendered obvious, suggested, or even implied by any of the prior art engine brakes, either alone or in any combination thereof.

To attain this, the present invention is adapted for use with a vehicular accessory power source and a pair of brake lights mounted on a rear of a vehicle and connected to ground for illuminating upon the actuation thereof. A brake light switch is connected to the power source and the brake lights of the vehicle for actuating the same upon the receipt of power. While not shown, the brake light switch is further connected to a brake pedal for being supplied with power upon the depression thereof. Also included is an engine brake having a plurality of engine brake coils connected to ground. The engine brake further has a stage switch with a first node connected to the engine brake coils and a second node. An engine brake master switch is included having an open orientation upon the engine brake being unemployed and a closed orientation upon the engine brake being employed. The engine brake master switch has a first node connected to the power source and a second node. Also included is a normally closed clutch switch having an open orientation only upon the depression of a clutch of the vehicle. As shown in FIG. 1, the clutch switch includes a first node connected to the second node of the engine brake master switch and a second node. Associated therewith is a normally closed throttle switch having an open orientation only upon the depression of a throttle of the vehicle. The throttle switch includes a first node connected to the second node of the clutch switch and a second node. The second node of the throttle switch is connected to the second node of the stage switch of the engine brake. The present invention entails a connection between the second node of the throttle switch and the brake light switch with both a diode and a manually reset circuit breaker connected therebetween. In use, the brake light switch is supplied with power and the brake lights are actuated upon the lack of the depression of the clutch switch and the throttle switch in combination with the closing of the engine brake master switch, thereby indicating to following drivers that the vehicle is slowing by means of an engine brake.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new engine brake indicator light apparatus and method which has many of the advantages of the engine brakes mentioned heretofore and many novel features that result in a new engine brake indicator light which is not anticipated, rendered obvious, suggested, or even implied by any of the prior art engine brakes, either alone or in any combination thereof.

It is another object of the present invention to provide a new engine brake indicator light which may be easily and efficiently manufactured and marketed.

It is a further object of the present invention to provide a new engine brake indicator light which is of a durable and reliable construction.

An even further object of the present invention is to provide a new engine brake indicator light which is susceptible of a low cost of manufacture with regard to both materials and labor, and which accordingly is then susceptible of low prices of sale to the consuming public, thereby making such engine brake indicator light economically available to the buying public.

Still yet another object of the present invention is to provide a new engine brake indicator light which provides in the apparatuses and methods of the prior art some of the advantages thereof, while simultaneously overcoming some of the disadvantages normally associated therewith.

Still another object of the present invention is to provide a new engine brake indicator light for providing an indication to a following driver that a vehicle is slowing by way of an engine brake.

Even still another object of the present invention is to provide a new engine brake indicator light that is adapted for use with a vehicular accessory power source and a pair of brake lights mounted on a rear of a vehicle. Included is an engine brake having a plurality of engine brake coils, a stage switch, and an engine brake master switch with a first orientation upon the engine brake being unemployed and a second orientation upon the engine brake being employed. In use, the engine brake master switch is connected between the power source and the brake lights for actuating the brake lights only upon being in the second orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
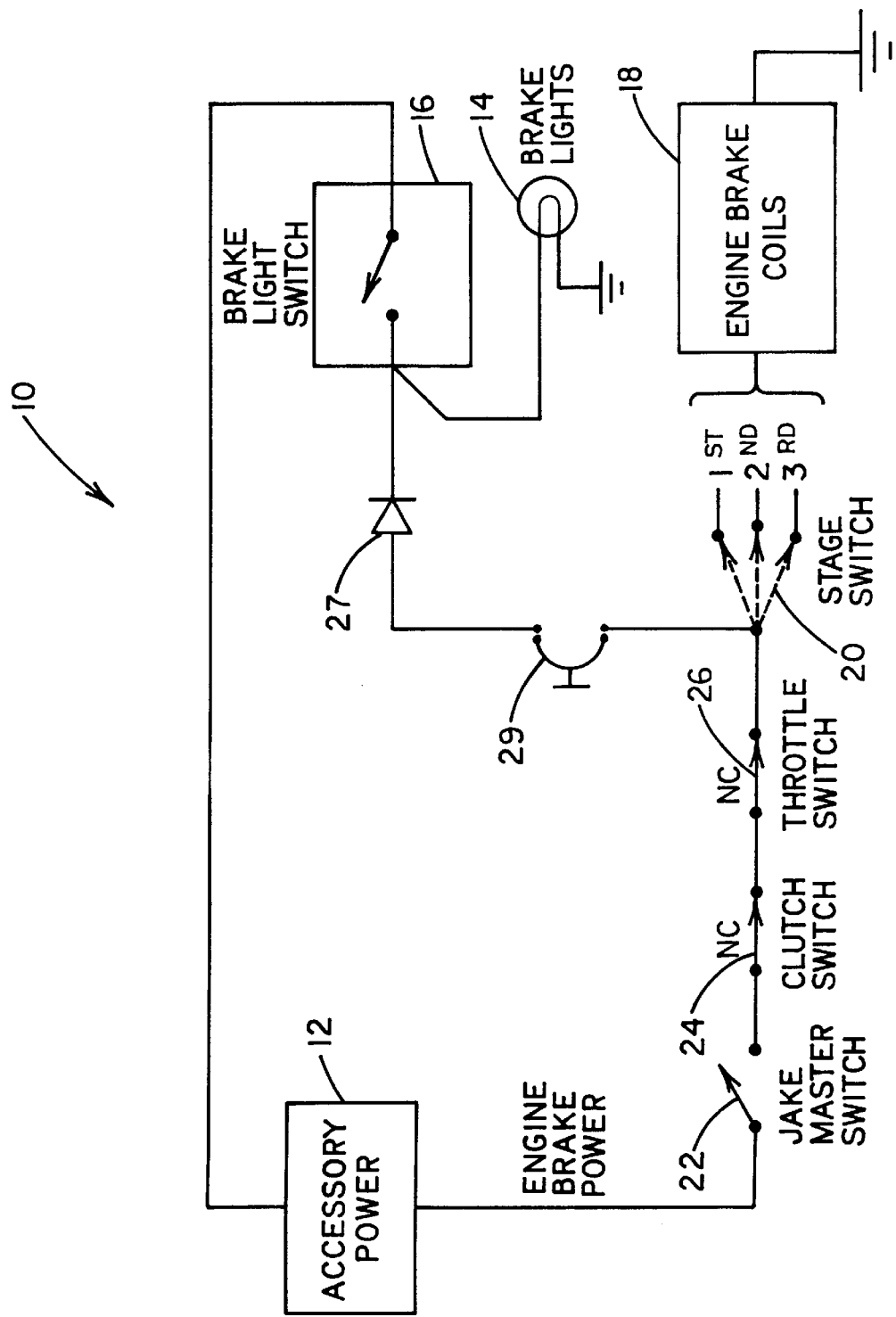
FIG. 1 is a schematic diagram of a new engine brake indicator light according to the present invention.

With reference now to the drawings, and in particular to FIG. 1 thereof, a new engine brake indicator light embodying the principles and concepts of the present invention and generally designated by the reference numeral 10 will be described.

The present invention, designated as numeral 10, is adapted for use with a vehicular accessory power source 12 and a pair of brake lights 14 mounted on a rear of a vehicle and connected to ground for illuminating upon the actuation thereof.

A brake light switch 16 is connected to the power source and the brake lights of the vehicle for actuating the same upon the receipt of power. While not shown, the brake light switch is further connected to a brake pedal for being supplied with power upon the depression thereof.

Also included is an engine brake such as a JAKE TM brake or the like having a plurality of engine brake coils 18 connected to ground. The engine brake further has a stage switch 20 with a first node connected to the engine brake coils and a second node. As is conventional, the stage switch operates the engine brake in various modes. An SPST engine brake master switch 22 is included having an open orientation upon the engine brake being unemployed and a closed orientation upon the engine brake being employed. It should be noted that the engine brake master switch may be manually closed or closed automatically upon the employment of the engine brake. The engine brake master switch has a first node connected to the power source and a second node.

Also included is a normally closed clutch switch 24 having an open orientation only upon the depression of a clutch of the vehicle. As shown in FIG. 1, the clutch switch includes a first node connected to the second node of the engine brake master switch and a second node. In the preferred embodiment, the clutch switch is connected between the clutch and a floorboard of the vehicle or by any other means.

Associated therewith is a normally closed throttle switch 26 having an open orientation only upon the depression of a throttle of the vehicle. The throttle switch includes a first node connected to the second node of the clutch switch and a second node. The second node of the throttle switch is connected to the second node of the stage switch of the engine brake. In the preferred embodiment, the throttle switch is connected between the throttle and a floorboard of the vehicle or by any other means.

The present invention entails a connection between the second node of the throttle switch and the brake light switch with both a diode 27 and a manually reset circuit breaker 29 connected therebetween. In use, the brake light switch is supplied with power and the brake lights are actuated upon the lack of the depression of the clutch switch and the throttle switch in combination with the closing of the engine brake master switch, thereby indicating to following drivers that the vehicle is slowing by means of the engine brake. As is apparent from FIG. 1, the engine brake is further only allowed to operate upon lack of the depression of the clutch switch and the throttle switch in combination with the closing of the engine brake master switch. As an option, a dash-mounted circuit breaker may be mounted anywhere along the circuit loop shown in FIG. 1 for protection purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An engine brake indicator system comprising, in combination:

a vehicular accessory power source;

a pair of brake lights mounted on a rear of a vehicle and connected to ground for illuminating upon the actuation thereof;

a brake light switch connected to the power source and the brake lights for actuating the same upon the receipt of power, the brake light switch further connected to a brake pedal for being supplied with power upon the depression thereof;

an engine brake including a plurality of engine brake coils connected to ground, a stage switch having a first node connected to the engine brake coils and a second node, and an engine brake master switch having an open orientation upon the engine brake being unemployed and a closed orientation upon the engine brake being employed, wherein the engine brake master switch has a first node connected to the power source and a second node;

a diode being connected between the second node and the brake light switch for preventing feedback from the brake light switch from adversely affecting the stage switch;

a circuit breaker being connected between the diode and the second node to prevent the brake light switch from being damaged by a spike in current between the second node and brake light switch;

a normally closed clutch switch having an open orientation only upon the depression of a clutch of the vehicle, the clutch switch including a first node connected to the second node of the engine brake master switch and a second node; and a normally closed throttle switch having an open orientation only upon the depression of a throttle of the vehicle, the throttle switch including a first node connected to the second node of the clutch switch and a second node connected to the second node of the stage switch of the engine brake and further the brake light switch;

wherein the brake light switch is supplied with power and the brake lights actuated upon the lack of the depression of the clutch switch and the throttle switch in combination with the closing of the engine brake master switch.

2. An engine brake indicator system comprising:

a vehicular power source;

at least one brake light mounted on a rear of a vehicle and connected to the power source for illuminating upon the actuation thereof;

an engine brake including a plurality of engine brake coils and a stage switch, the engine brake connected to the at least one brake light for actuating the same upon the engine brake being employed, a diode being connected between the stage switch and the at least one brake light for preventing feedback front the at least one brake light from adversely affecting the stage switch;

brake light switch connected to tile power source and the brake light for actuating the brake light upon the receipt of power; and a circuit breaker being connected between the diode and the stage switch to prevent the brake light switch from being damaged by a spike in current between the stage switch and the brake light switch.

3. An engine brake indicator system as sel forth in claim 2 and further including a clutch switch for precluding the actuation of the brake light upon the employment of the engine brake in combination with a clutch of the vehicle being depressed.

4. An engine brake indicator system as set forth in claim 2 and further including a throttle switch for precluding the actuation of the brake light upon the employment of the engine brake in combination with a throttle of the vehicle being depressed.

5. An engine brake indicator system as set forth in claim 2 wherein the brake light is connected to a brake pedal for actuating unconditionally upon the depression thereof.

* * * * *